US012583255B2

(12) United States Patent
Melancon, Jr. et al.

(10) Patent No.: US 12,583,255 B2
(45) Date of Patent: Mar. 24, 2026

(54) SYSTEMS AND METHODS FOR AUTOMATED CONTAINER WHEEL ASSEMBLY MANUFACTURING

(71) Applicant: Melancon Holdings, LLC, Lynchburg, VA (US)

(72) Inventors: Dennis Wayne Melancon, Jr., Lynchburg, VA (US); Charles Hendricksen, Fernandina Beach, FL (US)

(73) Assignee: Melancon Holdings, LLC, Lynchburg, VA (US)

( * ) Notice: Subject to any disclaimer, the term of this patent is extended or adjusted under 35 U.S.C. 154(b) by 0 days.

(21) Appl. No.: 19/016,437

(22) Filed: Jan. 10, 2025

(65) Prior Publication Data

US 2025/0222718 A1     Jul. 10, 2025

Related U.S. Application Data

(60) Provisional application No. 63/619,489, filed on Jan. 10, 2024.

(51) Int. Cl.
   B60B 31/00       (2006.01)
   B23D 59/00       (2006.01)
              (Continued)

(52) U.S. Cl.
   CPC ............ B60B 31/00 (2013.01); B23D 59/001 (2013.01); B23K 37/047 (2013.01); B25J 9/0084 (2013.01);
              (Continued)

(58) Field of Classification Search
   CPC .............. B60B 31/00; B60B 2310/226; B60B 2310/302; B60B 2320/10;
              (Continued)

(56) References Cited

U.S. PATENT DOCUMENTS 4,629,860 A * 12/1986 Lindbom ............... B25J 18/007
                                     901/42
6,479,786 B1 * 11/2002 Fields, Jr. ............ B23K 26/242
                                 219/121.63

(Continued)

FOREIGN PATENT DOCUMENTS

DE      202024100237 U1 *  4/2025   ........... B25J 9/1697

*Primary Examiner* — Bayan Salone
(74) *Attorney, Agent, or Firm* — Laubscher & Fretwell, P.C.

(57)          ABSTRACT

An automated container wheel manufacturing system includes a bracket and wheel end cap laser and staging subsystem, an axle sawing subsystem, an axle housing machining subsystem, and a wheel pipe sawing subsystem. The wheel end cap laser and staging subsystem is configured to manufacture mounting brackets and wheel end caps, the axle sawing subsystem is configured to manufacture axle housings, the axle housing machining subsystem is configured to manufacture axle housings, and the wheel pipe sawing subsystem is configured to manufacture wheel pipes. An assembly and welding area includes a plurality of robotic welding arms and an I-beam to which the plurality of robotic welding arms are attached for movement within a robotic zone. There is an axle housing and wheel end cap welding region, a wheel pipe welding region, and a bracket and axle welding region.

1 Claim, 14 Drawing Sheets

(51) Int. Cl.

| | |
|---|---|
| *B23K 26/38* | (2014.01) |
| *B23K 37/04* | (2006.01) |
| *B23K 37/047* | (2006.01) |
| *B25J 9/00* | (2006.01) |

(52) U.S. Cl.
CPC ............. *B25J 9/0093* (2013.01); *B23K 26/38* (2013.01); *B60B 2310/226* (2013.01); *B60B 2310/302* (2013.01); *B60B 2320/10* (2013.01); *B60B 2360/102* (2013.01); *B60B 2900/112* (2013.01); *B60B 2900/113* (2013.01)

(58) Field of Classification Search
CPC ......... B60B 2360/102; B60B 2900/112; B60B 2900/113; B23D 59/001; B23K 37/047; B23K 26/38; B25J 9/0084; B25J 9/0093
See application file for complete search history.

(56) References Cited

U.S. PATENT DOCUMENTS

| | | | | |
|---|---|---|---|---|
| 12,103,119 | B2 * | 10/2024 | Adcock .................. | B23K 9/028 |
| 2007/0023408 | A1 * | 2/2007 | Yuk Man ............. | B23K 9/1274 |
| | | | | 219/130.21 |
| 2013/0088074 | A1 * | 4/2013 | Denney .................. | B23K 26/28 |
| | | | | 219/121.64 |
| 2015/0128719 | A1 * | 5/2015 | Kilibarda ........... | B23K 11/3063 |
| | | | | 29/402.19 |
| 2015/0136318 | A1 * | 5/2015 | Tiefel ................... | B29C 66/342 |
| | | | | 156/272.8 |
| 2019/0160583 | A1 * | 5/2019 | Matthews ............ | B23K 31/003 |
| 2021/0001491 | A1 * | 1/2021 | Strouse ................. | B23Q 7/048 |
| 2021/0069813 | A1 * | 3/2021 | Eskandari ........... | B23K 9/1274 |
| 2023/0041636 | A1 * | 2/2023 | Adcock ............... | B23K 9/0956 |
| 2023/0099434 | A1 * | 3/2023 | Saez ................... | B62D 65/026 |
| | | | | 29/407.04 |

* cited by examiner 106                                    104                                    108

106                                    104                                    108

SYSTEMS AND METHODS FOR AUTOMATED CONTAINER WHEEL ASSEMBLY MANUFACTURING

BACKGROUND OF THE INVENTION

The present invention relates to manufacturing wheels for a container, and more particularly to methods and systems for automated wheel container manufacturing.

Containers, such as roll-off containers, are well known. They typically include a pair of side walls, a pair of end walls, and a bottom wall defining an inner chamber with an open upper end. Such containers are usually used to store waste, equipment, or other bulk items. There are numerous examples of such containers, some of which have a door or doors at one or both ends that allow for access into the chamber other than through the upper end opening. Some include covers or top walls.

Preferably such containers are constructed to be transported from one location, at which materials are loaded into the container, to another location, at which the materials are removed from the container. For instance, the containers can be used to haul waste from a work site to a landfill, to haul materials to be deposited at a work site, or to haul equipment from a storage facility to a work site. The containers are normally hauled from location to location on a flatbed truck. For ease of loading and unloading, the containers typically have at least two wheels arranged at one end of the container to allow for the containers to be pulled and rolled onto a flatbed truck.

The size and specifications of these containers make them challenging to manufacture, requiring individual attention to assembly of each container. This increases manufacturing time and costs. There is a need, therefore, to provide for automated manufacture of containers and container components.

SUMMARY OF THE INVENTION

Accordingly, it is an object of the present disclosure to provide an automated container wheel manufacturing system that includes a bracket and wheel end cap laser cutting and staging subsystem, an axle sawing and tack welding subsystem, an axle housing machining subsystem, and a wheel pipe sawing and welding subsystem. An assembly and welding area includes a plurality of robotic assembly and welding arms and an I-beam to which a plurality of robotic arms are attached for movement within a robotic zone. There is an axle housing and wheel end cap assembly and welding region, a wheel pipe assembly and welding region, and a bracket and axle assembly and welding region within the welding area.

The laser cutting and staging subsystem is configured to manufacture mounting brackets and wheel end caps. This subsystem includes an automated laser cutting table, a roller table, at least one device configured to load steel plates into the automated laser cutting table, and at least one device configured to sort the mounting brackets and wheel end caps.

One sawing subsystem is configured to manufacture axle housings, and includes an automated saw configured to cut pipes, an automated conveyor belt, a staging area for the axle housings, and one or more robotic loading arms configured to move axle housings. The automated conveyor belt moves the cut pipes from the automated saw to the staging area, where one or more robotic loading arms load them into the staging area. Once loaded, the parts are ready for assembly and welding.

The machining subsystem is configured to manufacture axles and includes a Computer Numerical Control machine, a smart conveyor belt configured to load steel rods into the Computer Numerical Control machine, an axle staging area, and a smart conveyor belt configured to load the axles into the axle staging area.

It is also an object of the present disclosure to provide an automated container wheel assembly manufacturing system that includes a robotics assembly unit and a robotics weld unit, each of which includes at least one robotic arm. The robotics assembly unit is configured to handle components of a container wheel assembly to connect at least one wheel component with another wheel component. The robotics weld unit receives assembled wheel components from the robotics assembly unit and welds a portion of at least one component to a portion of another component. The robotics assembly unit and robotics weld unit are arranged adjacent, and preferably opposite, one another to allow for exchange of assembled and welded container wheel components between respective robotics units.

The robotics assembly unit is configured to, connect a pair of end discs containing a central opening to respective opposing ends of an outer tube to form a first wheel assembly portion, insert the first portion into an outer tube to form a second wheel assembly portion, and connect an axle shaft having a first and second end with a pair of respective wheel brackets containing an opening. The axle shaft first end is connected with the opening of a first bracket and the axle shaft second end is inserted through the outer tube and connected with the opening of a second bracket.

The robotics weld unit is configured to weld the pair of end discs to the respective opposing ends of the outer tube, weld the outer tube to opposite sides of the first wheel assembly, and weld the axle shaft first end and axle second end with the first and second brackets, respectively.

In one embodiment, the system further includes a rotatable work surface arranged and rotatable between the robotics assembly unit and robotics weld unit such that when the robotics assembly unit assembles a portion of a container wheel the rotatable work surface is rotated to the robotics weld unit to weld the assembled portion. When assembly and welding of the container wheel assembly components is complete, the robotics assembly unit or robotics weld unit removes the container wheel from the rotatable work surface for packaging.

In another embodiment, the system includes a component supply conveyer having a portion of the conveyer arranged adjacent the robotics assembly unit or robotics weld unit and programmed to move at least one container wheel component to the respective robotics unit. There is preferably also a container wheel exit conveyer having a portion of the conveyer arranged adjacent the robotics assembly unit or robotics weld unit and programmed to move container wheels to a packaging location.

In yet another embodiment, the robotics assembly unit is arranged within a first enclosure and the robotics weld unit is arranged within a second enclosure adjacent the first enclosure. The rotatable work surface is rotatable between the first enclosure and second enclosure.

In a further embodiment, the component supply conveyer has a portion arranged in the first enclosure to move at least one component of a wheel cell from an exterior of the first enclosure to an interior of the first enclosure. Similarly, the container wheel exit conveyer has a portion arranged in the first enclosure to move a container wheel from an interior of the first enclosure to an exterior of the first enclosure. Preferably, the system further includes an end disc supply, a wheel bracket supply, an inner tube supply, and an axle supply each arranged within the first enclosure.

BRIEF DESCRIPTION OF THE DRAWINGS

The invention will be explained in greater detail below using embodiments with the aid of the accompanying figures in which.

DETAILED DESCRIPTION

Figure 1:
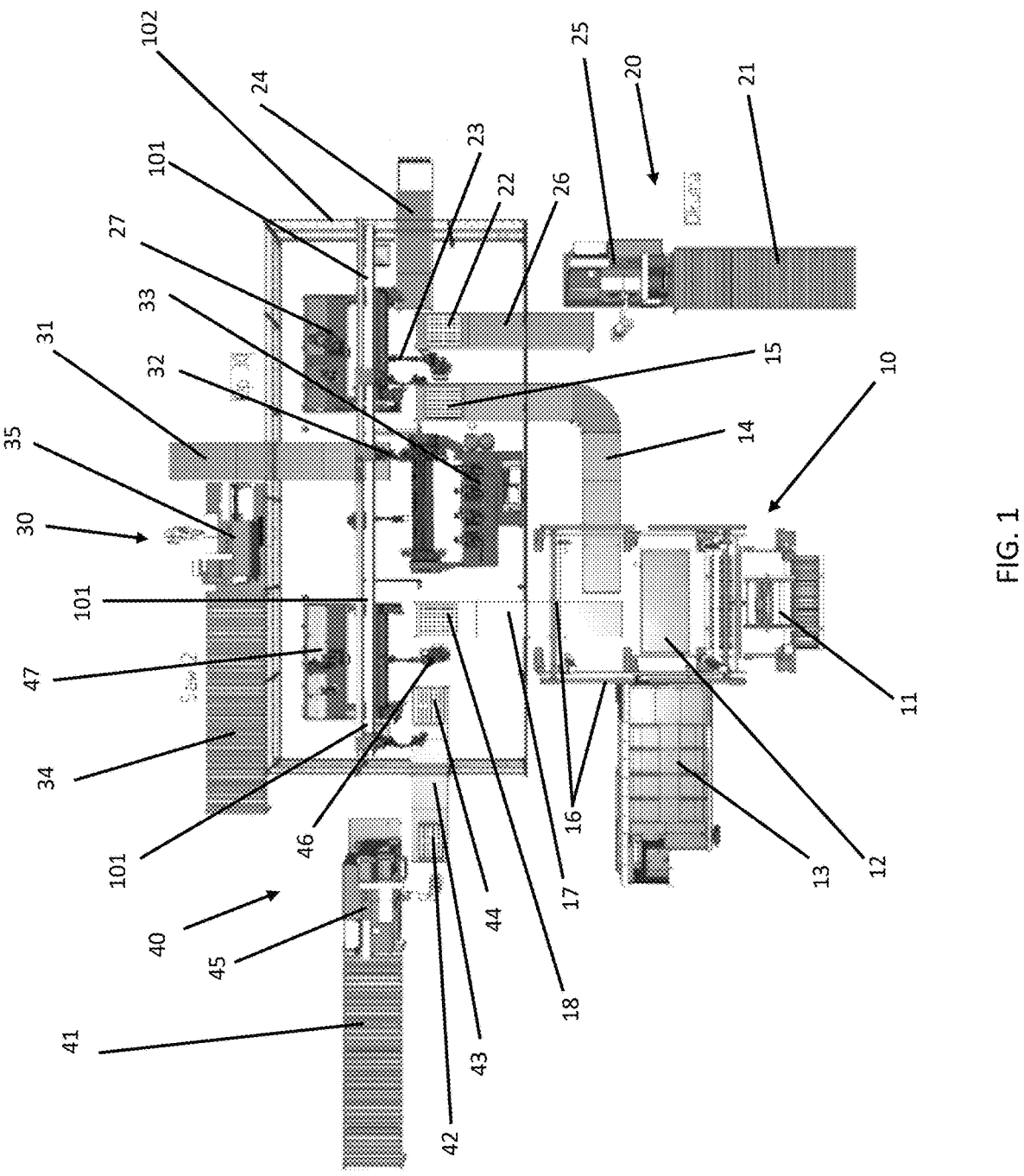
FIG. 1 is a top view of a first automated wheel manufacturing system according to the present disclosure.
Figure 2:
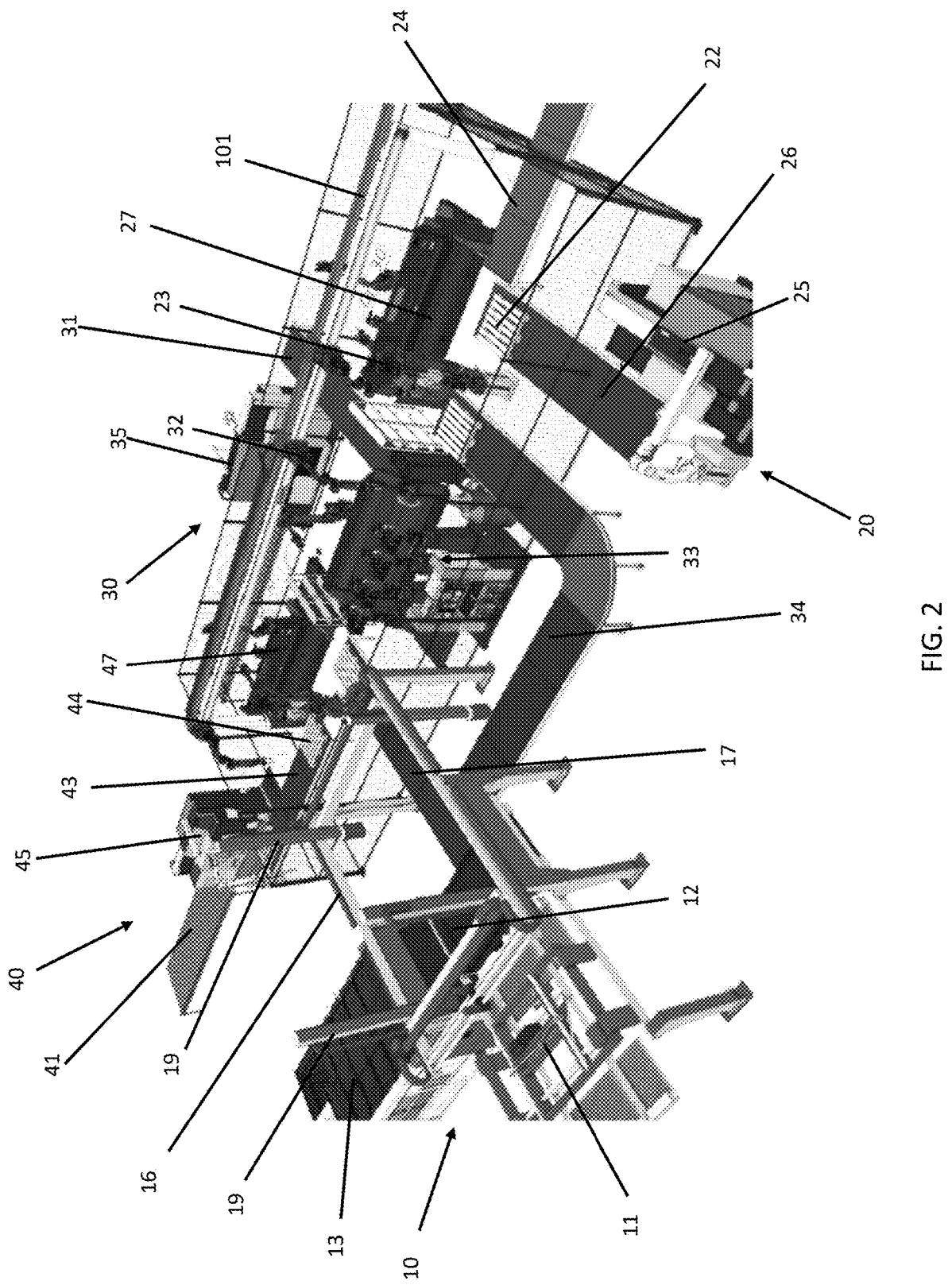
FIGS. 2 and 3 are partial perspective views of the manufacturing wheel assembly of FIG. 1.
Figure 3:
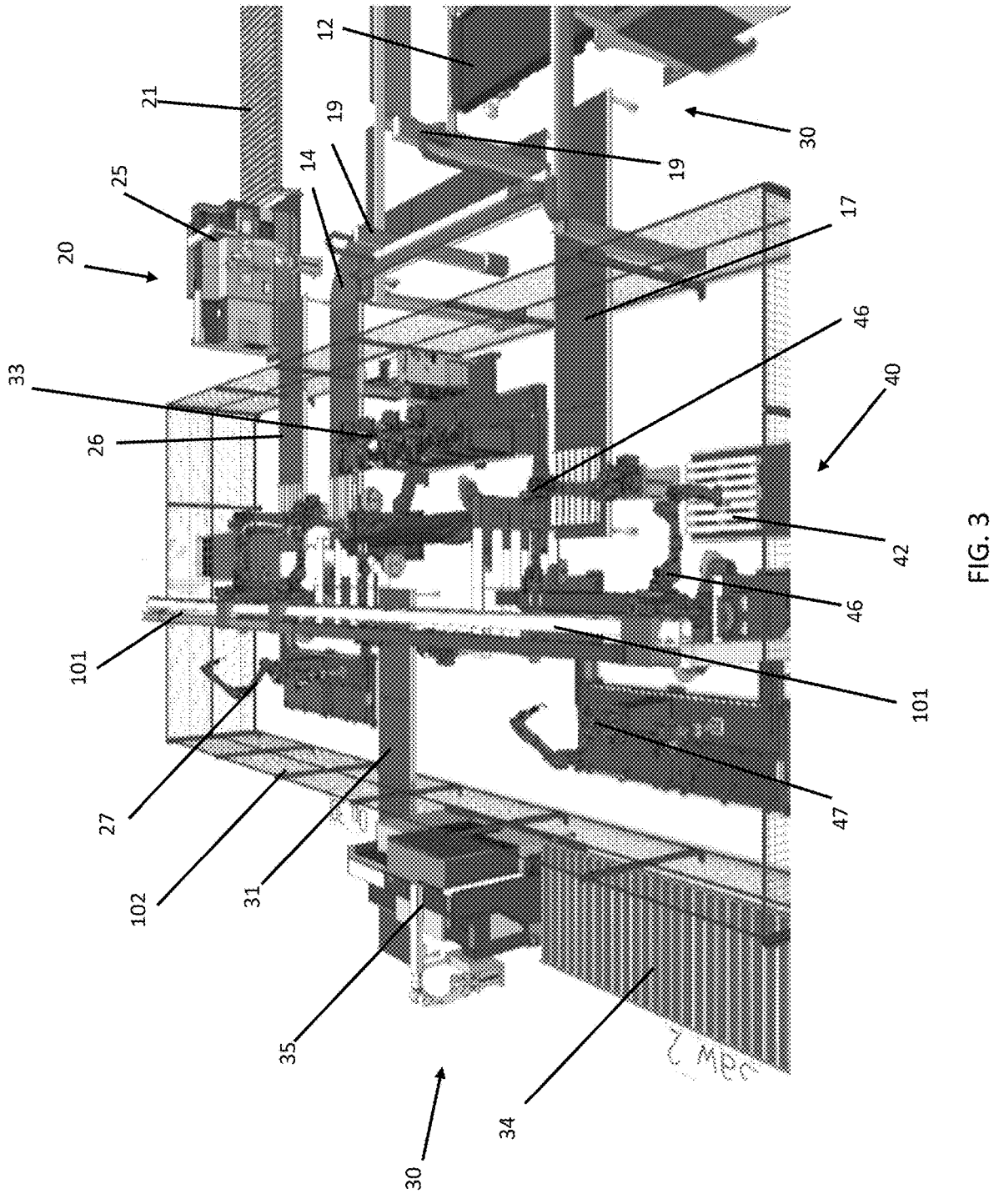
Figure 4:
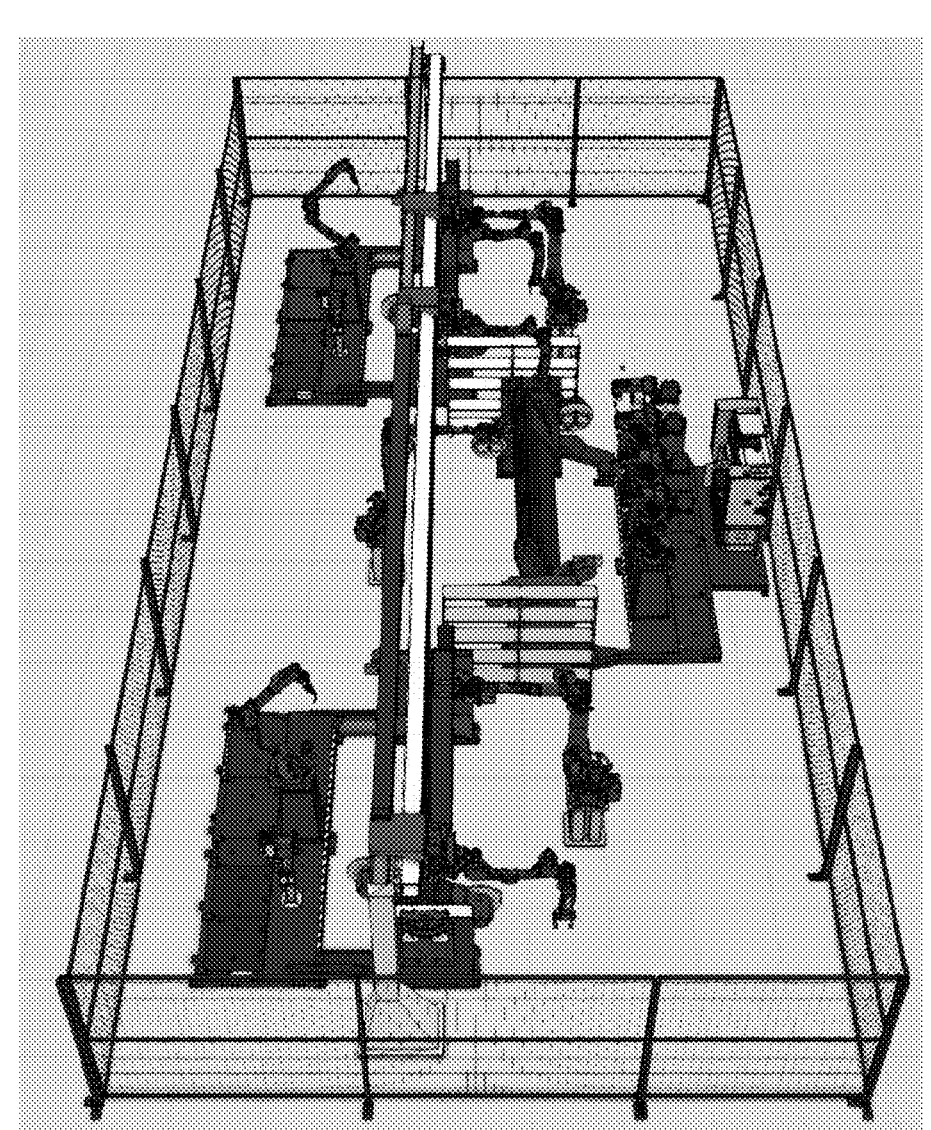
FIG. 4 is a top perspective view of a welding area for an automated manufacturing system according to the present disclosure.

Referring first to FIGS. 1-3, there is an automated container wheel manufacturing system 2 with a plurality of subsystems, 10, 20, 30, 40 each of which prepares a portion of a container wheel for manufacturing. The first subsystem 10 is for laser cutting mounting brackets and wheel end caps. This subsystem 10 includes a loading arm 11, for loading steel plates onto a roller table 12, and an automated laser table 13 for cutting the plates.

The automated laser cutting table 13 for steel plates is where ¼" and ½" plates will be cut to produce the side brackets, outer wheel hub, and other small parts as needed for wheel manufacturing. The laser table will select a plate to load, then the automated rollers 12 will roll the plate into the laser-cutting shielded area 13. The laser will then cut the parts and any small unused scrap will fall through a grate into a recycling bin that is expected will have to be emptied once a day by a person. When cutting is complete, the plate will roll back out where post handlers 16 will remove each part and stack them on the appropriate pallet 14, 17 to move to the inner work area for welding. The post handlers are handling robots that know what was cut from the laser table and where to place the finished parts for entry into the production line. They can move on an x-y-z axis.

The laser is operated to cut the steel plate into at least one bracket or at least one wheel end cap for a wheel assembly.

Depending on the size of the steel plate, multiple brackets or wheel end caps may be cut from a single plate. A single plate may be used to cut multiple brackets and then a separate plate used to cut multiple wheel end caps, or the same plate may be used to cut both depending on preference and cutting capabilities of the laser. Preferably the laser will be programmed such that maximum steel is used from a single plate and thus waste is reduced.

Preferably, bracket size is predetermined such that the laser can automatically cut brackets without the need for user instruction. It will be understood by those with skill in the art that the predetermined size can be adjusted prior to or during cutting as required.

As noted, once a bracket or brackets and/or wheel end cap or caps are cut, an automated picker 16 moves the brackets/caps to respective conveyer systems for later assembly. Brackets are moved to the mounting bracket conveyer 14 which moves the brackets to the mounting bracket staging area 15, and wheel end caps are moved to the wheel end cap conveyer 17 which moves the end caps to the wheel end cap staging area 15.

Referring now to the second automated subsystem 20, that is included for production of axles. The subsystem includes an automated Computer Numerical Control (CNC) machine 25 which is included to prepare axles from steel rods. A smart conveyor belt system 21 is included to load rods into the CNC machine where they are machined into axles. The axle machine 25 is programmed to cut small solid steel rod for the axles, mill and machine them for grease fitting and grease flow through the axle. A robotic arm 28 is arranged adjacent the CNC machine to handle complete axles and move them to an additional smart conveyor belt system 26 that carries the axles to an axle staging area 22, where another robotic arm 23 stages the axle for welding. The robotic arms 23, 28 are preferably collaborative robots configured for safe interaction with humans. In some embodiments the CNC machine is a saw or lathe.

Moving to the automated system 30 for wheel pipes, there is a roller conveyor belt 34 for loading one or more pipes into an automated saw 35 which cuts the pipes to a specified length. Cut wheel pipes are moved to a conveyor belt 31 which moves the pipes to a handling robotic unit 32. The handling robotic unit 32 moves the pipes to a welding cell 33, described in detail below.

The wheel pipe saw 35 is preferably programmed to cut large 8" wheel pipe. In one example, 20 or more pipes are loaded onto the roller conveyer 34, preferably by an individual but an automated machine is also contemplated, where the saw will receive and cut the parts to length. A robot will then take the cut parts for introduction into the welding workflow.

A fourth automated subsystem 40 is provided for sawing and welding pipes for the production of axle housings. This automated subsystem 40 includes a roller conveyor belt 41 for loading one or more pipes into an automated saw 45 which cuts the pipes to a specified length. The axle housing saw cuts small pipe for the axle housing. An employee will preferably load 20 or more pipes into the saw and the saw will cut the parts to length. It will be understood by those with skill in the art that other means for loading the pipe onto the conveyer 34 could be used, for instance by a programmable transport device.

As with the steel plates and laser, the cutting length may be predetermined, determined at the time of cutting or adjusted at any point during manufacture. Preferably, the length or lengths of pipes is known and the saw is programmed to reduce the need for human control. Once pipe is cut into axles, a robotic arm moves the axles to a palette arranged on an automated conveyor belt 43 which is moved to an axle staging area. From there, a handling robot unit 46 loads the axle housings onto a workbench for initial welding, preferably tack welding.

Once all wheel parts are prepared, the wheel is assembled and welded. There are assembly and welding units 47, 33, 27 enclosed within a protective barrier 102. As components are prepared and moved from their respective subsystems to within the enclosed barrier, they are handled by the assembly and welding units.

Figure 5:
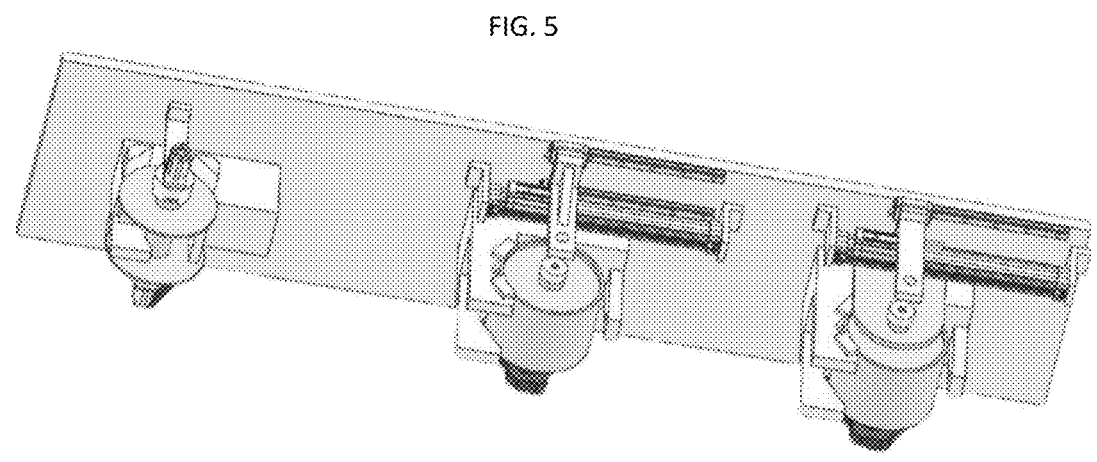
FIG. 5 is a perspective view of a wheel assembly jig.

A first cell 47 has handling robots to place parts of the wheel (wheel pipe, axle housing and/or wheel cap) into a jig for assembly. An assembly jig is shown in FIG. 5. Then a wall is operated to rotate 180 degrees for welding robots to tack the parts into place. The wall is rotated back and handling robots stack the partially-complete product on a rack to proceed to the second cell 33.

A second cell 33 will place the partially welded wheels from the first cell into an assembly jig for continued welding to complete the wheel. Preferably, the axle housing and wheel cap ends are welded at the first cell 37 and the wheel pipe is welded at the second cell 33. As with the first cell, a wall is rotated from a positioning side to a welding side, where welding robots weld the wheel pipe. The wall then rotates back to move the finished wheel to the next welding stage.

The final cell 27 is for assembling and welding the axle and mounting brackets. Like the previous sections, the robots will load the parts into a jig for final welding. At this stage, grease fitting, or Zerk fitting, is introduced. The wheel with bracket will be welded and completed wheel assemblies will be placed onto a conveyor 24 that will lead to a bin or other receptacle where an employee will prepare them for shipping or attachment with a container.

Robotic arms are programmed to move from one welding unit 47, 33, 27 to another via an overhead I-beam 101 to which they are connected. The I-beam 101 is configured to allow one or more handling robots to move the length of their assigned zone and to transport materials within a zone or from one zone to another.

Figure 6:
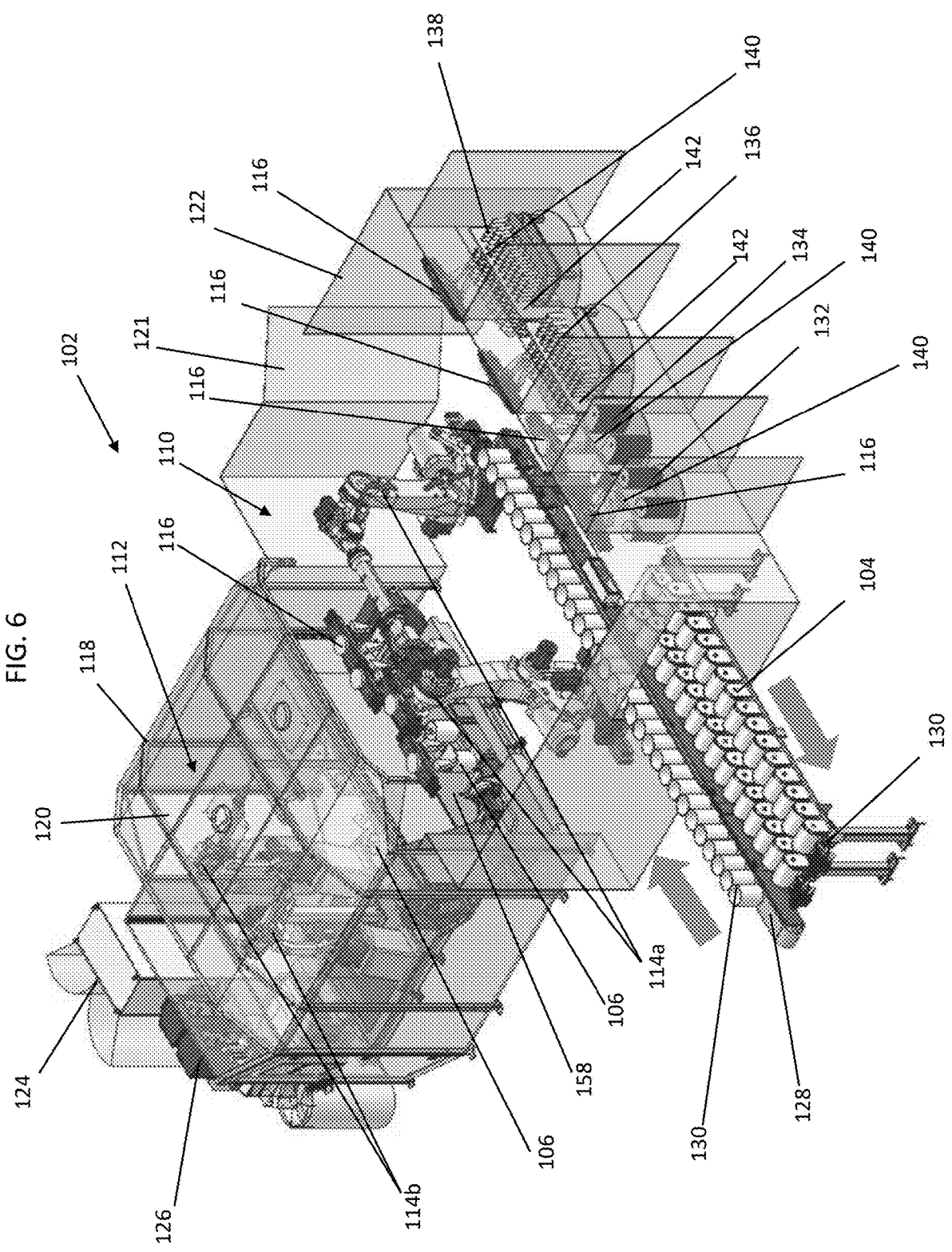
FIG. 6 is a perspective view of a second automated container wheel assembly manufacturing system according to the present disclosure.
Figure 7:
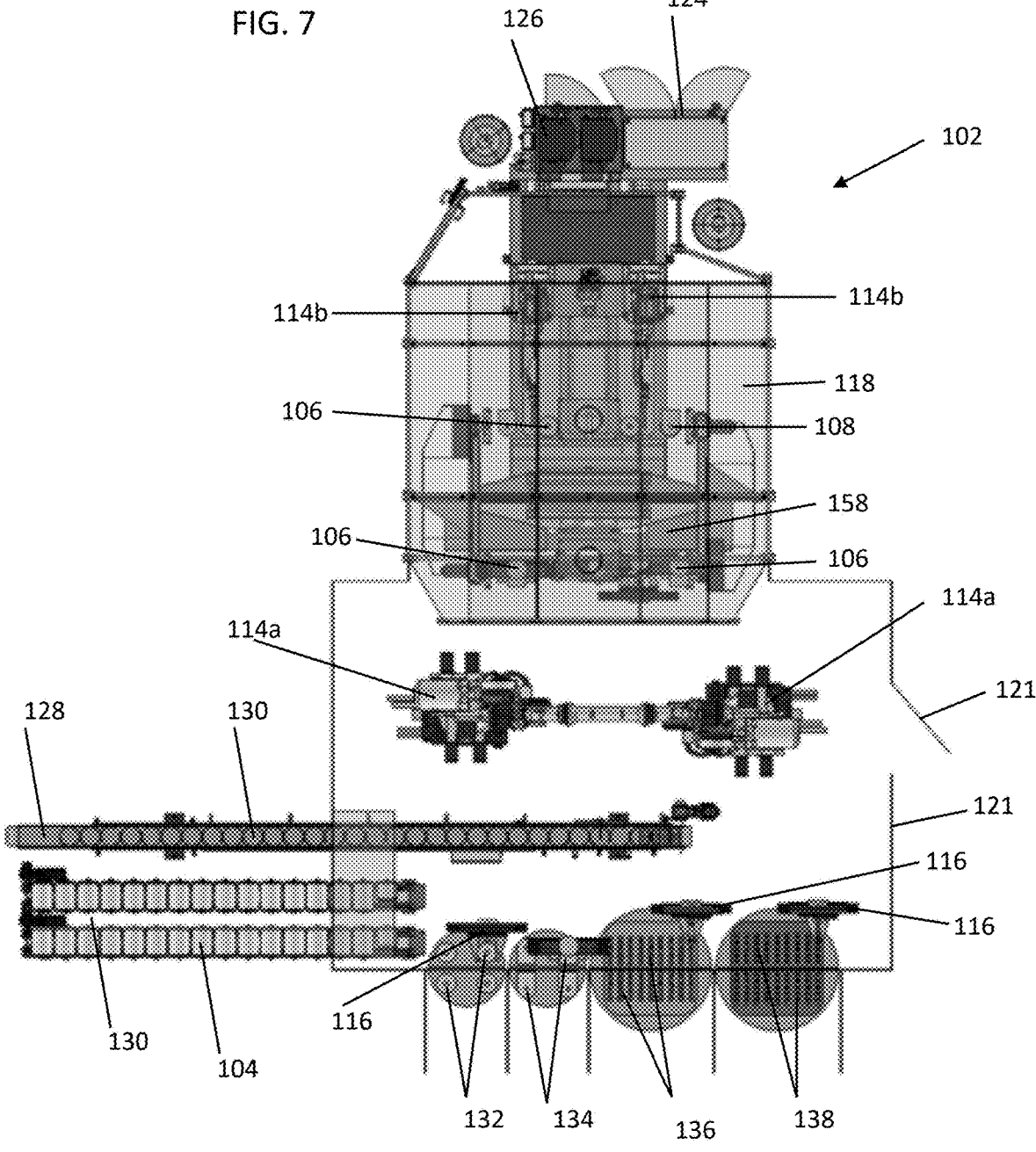
FIG. 7 is a top view of the manufacturing system of FIG. 6.
Figure 8:
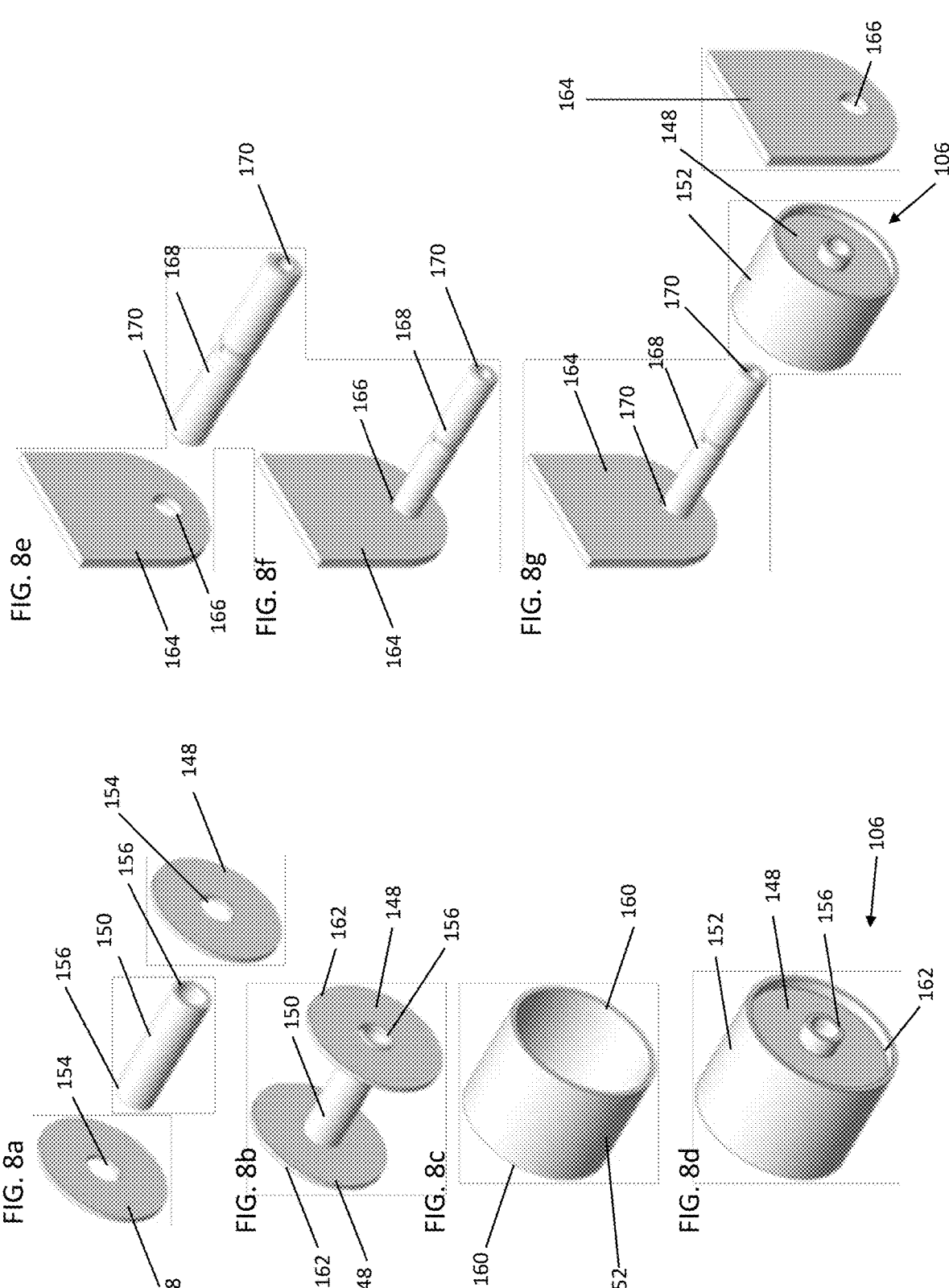
FIGS. 8*a*-8*g* are perspective views of different stages of manufacturing a wheel assembly for a container.

Referring now to FIGS. 6 and 7 there is a second system for automated manufacture of container wheel assemblies 102. Such wheel assemblies 104, shown in FIGS. 9 and 10, typically include a wheel 106 and axle 108, which are connected with the bottom of a heavy-duty metal container (not shown), such as a roll-off container. The system 102 includes two robotics units, an assembly unit 110 and welding unit 112, each of which includes two robotic arms 114a, 114b that are connectable with grippers 116 that handle elements of a wheel assembly during manufacture.

The robotics units 110, 112 are arranged within separate, adjacent enclosures. The welding unit enclosure 118 includes a roof 120, and the assembly unit enclosure 122 has an open upper end. As shown in FIGS. 6 and 7, the assembly unit enclosure 122 has an access door 121. It will be understood by those with skill in the art that different enclosure configurations could be implemented, including having both robotics units in a single enclosure or separate enclosures for each robotic arm. Moreover, robotics units may not have separate enclosures. The robotics units are powered and controlled by an electrical cabinet 124 and controllers 126, respectively.

A supply conveyer 128 and exit conveyer 130 are arranged partly within the assembly unit enclosure 122. As is shown in FIGS. 6 and 7, a portion of each conveyer is located on the outside of the assembly unit enclosure, and portion of each is located inside the enclosure. Outer tubes 130 to be used with a wheel assembly 104 enter the enclosure 122 via the supply conveyer 128 and are handled by an assembly unit robotic arm with gripper 114a, and completed wheel assemblies 104 are placed on the exit conveyer 130 by assembly robotic arms 114a to exit the enclosure 122 for packaging and shipment.

Figure 11:
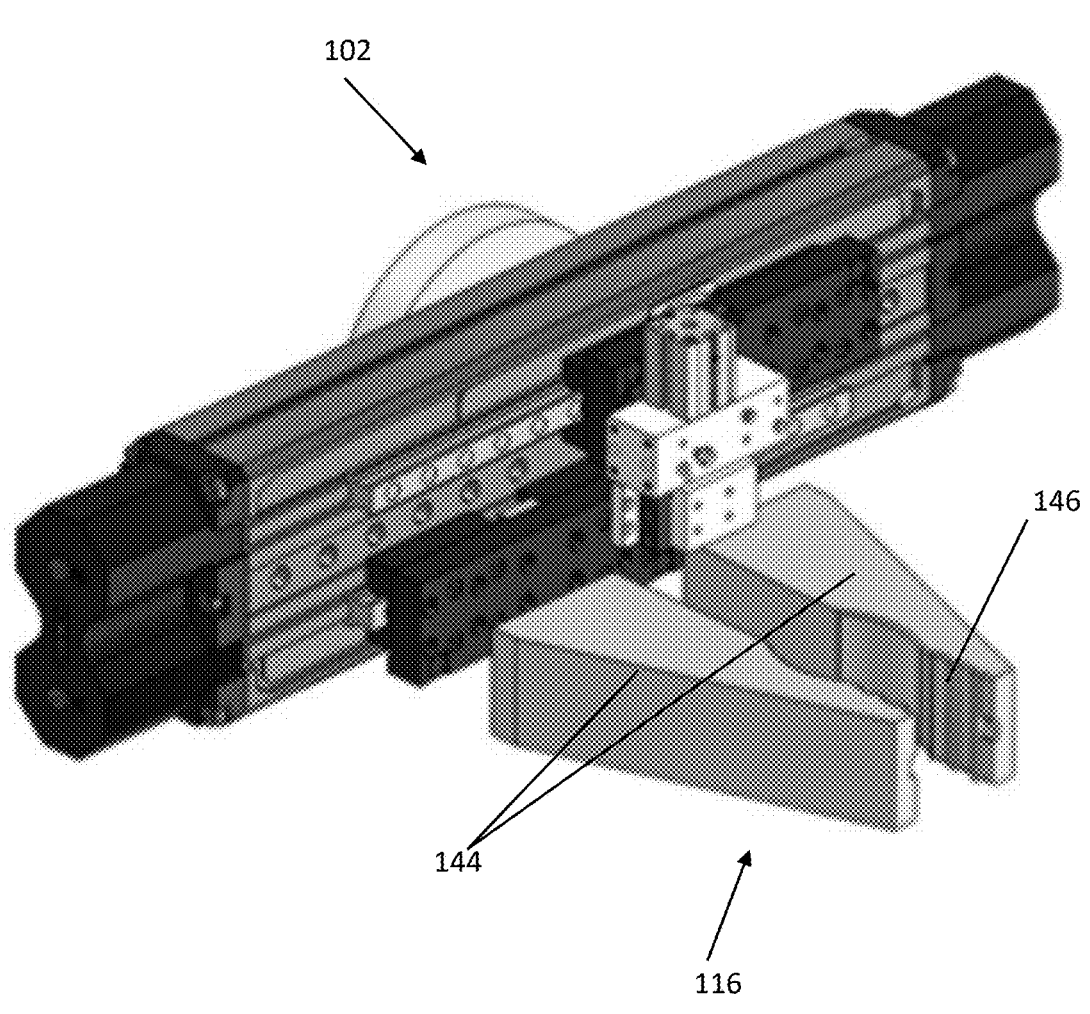
FIG. 11 is a perspective view of a robotic gripper according to the present disclosure.

Within the assembly unit enclosure 122 there is an end disc supply table 132, wheel bracket supply table 134, inner tube supply table 136, and axle supply table 138, each positioned along a wall of the assembly unit enclosure 122. Each table is positioned at an opening 140 in the enclosure and has a portion of the table within the assembly unit enclosure and a portion outside of the enclosure. Preferably a screen 142 is arranged within the opening to divide the inner and outer portions of each supply table. The tables rotate to provide supplies to the assembly unit 110 and to allow for an operator to resupply each supply table as needed. Grippers 116 are shown in FIGS. 6 and 7 with each set of supplies to show how each is handled by a robotic arm with gripper. FIG. 11 shows a detailed view of a gripper 116 having jaws 144 and grips 146.

Figure 9:
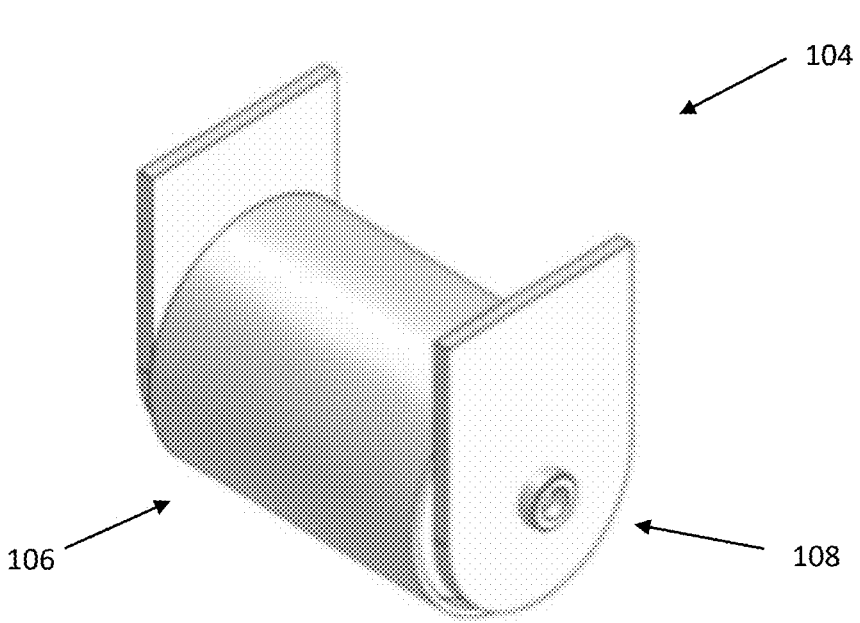
FIGS. 9 and 10 are embodiments of a manufactured wheel assembly for a container according to the present disclosure.
Figure 10:
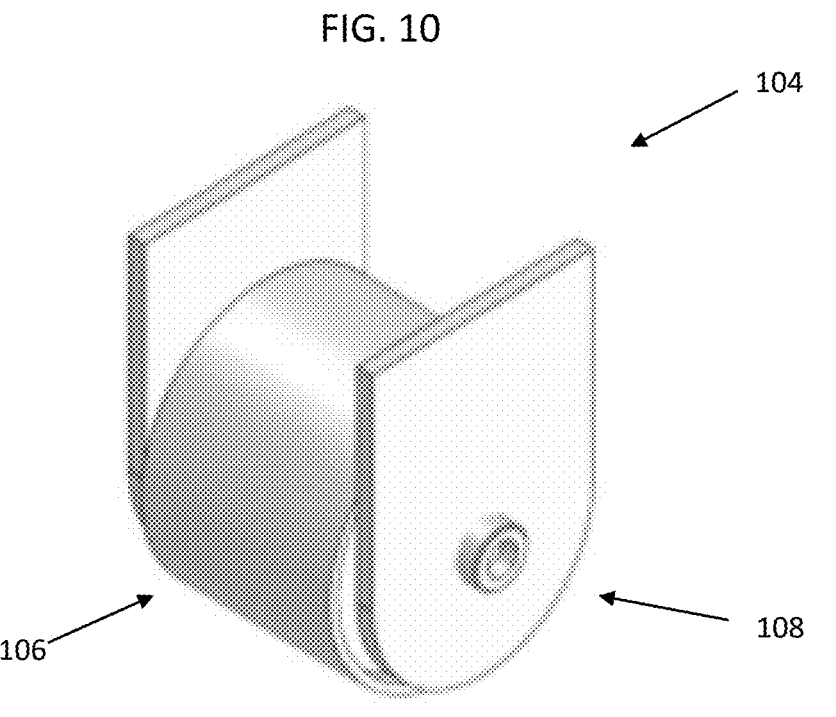

The steps for assembling the wheel 106 and axle 108 are shown in FIGS. 8a-8g, with fully manufactured wheel assemblies 104 shown in FIGS. 9 and 10. There are two main processes: assembling and welding the wheel and assembling and welding the axle.

The wheel 106 includes a pair of end discs 148, an inner tube 150 and an outer tube 152. The end discs contain an opening 54 which is connected with one end 156 of the inner tube. A robotic arm 114a from the assembly unit selects an inner tube 150 and two end discs 148 from each respective supply table 136, 132 in the assembly unit enclosure 122 and arranges them on a rotatable workbench 158 for assembly. The robotic arms 114 connect the inner tube ends 156 with edges of respective end disc openings 154 and then the rotatable worktable 158 is rotated from the assembly unit enclosure 122 to the welding unit enclosure 118. The robotic arms of the welding unit 112 then weld each end of the inner tube ends 156 to respective edges of end disc openings 154 and the workbench 158 is rotated back to the assembly enclosure 122. While the assembled inner tube 150 and end discs 148 are being welded, the assembly unit 110 selects another set of end discs 148 and inner tubes 150 for assembly, which are provided to the welding unit 112 when the workbench 158 is rotated. It will be understood by those with skill in the art that one or numerous robotic arms could carry out this process at the same time.

Once in the assembly enclosure, the robotic arms with gripper select an outer tube 152 from the supply conveyer 128 and slide it over the welded end discs 148 and inner tube 150. The workbench 158 is rotated again to the welding enclosure 118 and the robotic welding unit 112 then welds the ends 160 of the outer tube 152 to the outer edges 162 of the end discs 148. The wheel portion 106 of the wheel assembly 104 is complete. Preferably there is a jig located on the rotatable workbench 158 in which the elements of the wheel assembly are placed to provide for case of assembly and welding.

Separately, which can take place prior to, during or after assembly and welding of the wheel portion, the axle portion 108 is assembled and welded. The robotics arms with gripper 114 in the assembly unit enclosure 122 select a bracket 164 containing an opening 166 and an axle shaft 168 from their respective supply tables 134, 138 for assembly at the workbench 158. One end 170 of the axle shaft 168 is connected with the bracket opening 166 and then the workbench 158 is rotated to the welding enclosure 118 where the welding unit 112 welds the axle shaft end 170 to the edges of the bracket opening 166. The workbench 158 is then rotated back to the assembly enclosure 122 and the assembly robotic arms 114 insert the axle shaft free end into and through the wheel inner tube 150 until the free end of the axle shaft 168 extends beyond the end 156 of the inner tube 150. An assembly robotics arm 114 then selects a second bracket 164 from the bracket supply table 134 and connects it with the free end of the axle shaft 168. The workbench 158 is then rotated to the welding enclosure 118 and the welding robotic arms 114 weld the second bracket to the second end of the axle and the wheel assembly is complete. The workbench 158 then rotates back to the assembly enclosure 122 and a robotic arm 114 moves the manufactured wheel assembly 104 to the exit conveyer 130 for packaging and shipping.

In a separate embodiment of the process, the wheel 106 is assembled as described herein, the axle shaft 168 is inserted through the inner tube 150, and a pair of brackets 164 are connected with the axle shaft ends 170. The workbench 158 is rotated and the axle shaft ends 170 are welded to edges of the bracket openings 166 to complete the wheel assembly 104. It will be understood by those with skill in the art that the order of assembling and welding the elements of the wheel and axle may be adjusted without deviating from the spirit of the invention.

Figure 12:
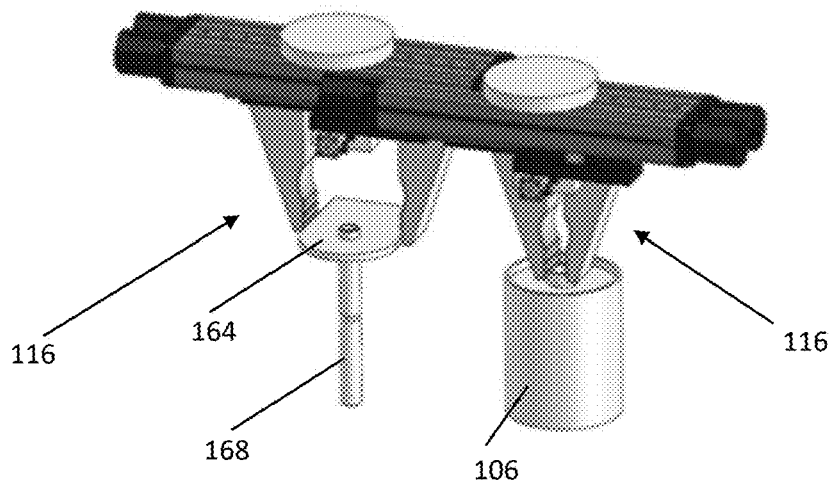
FIGS. 12-14 are perspective views of robotic grippers gripping components of a wheel assembly during manufacture.
Figure 13:
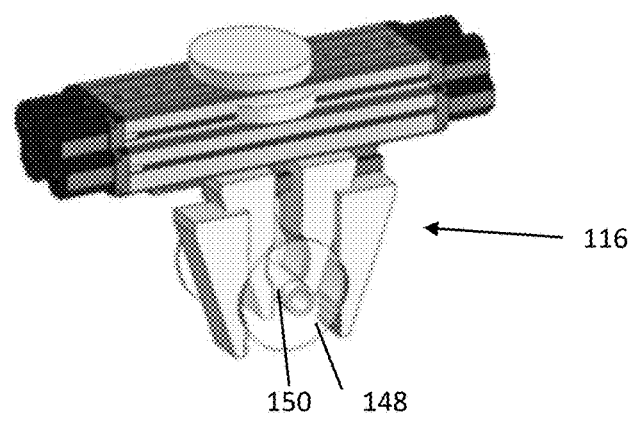
Figure 14:
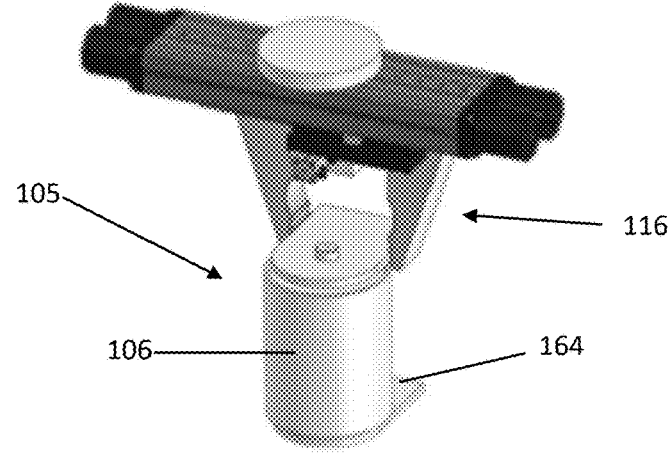
Figure 15:
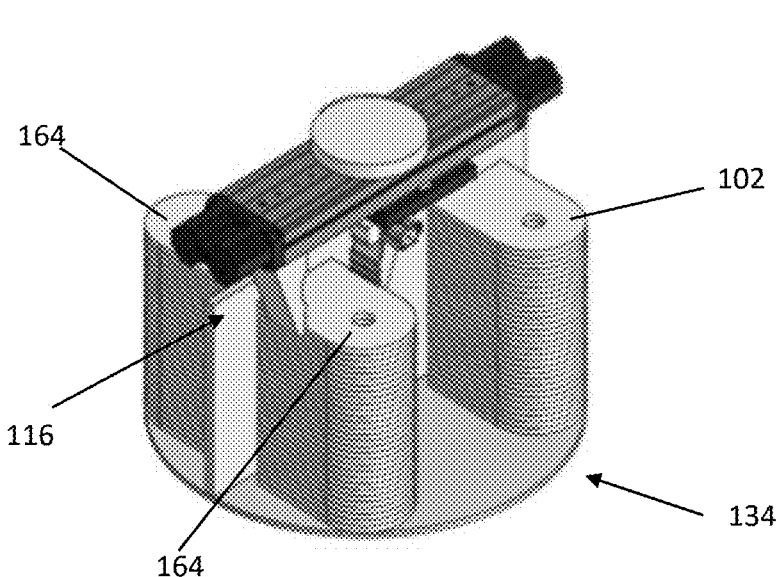
FIGS. 15-18 are perspective views of a robotic gripper selecting a wheel bracket, end disc, axle shaft and inner tube, respectively, from a supply of each.
Figure 16:
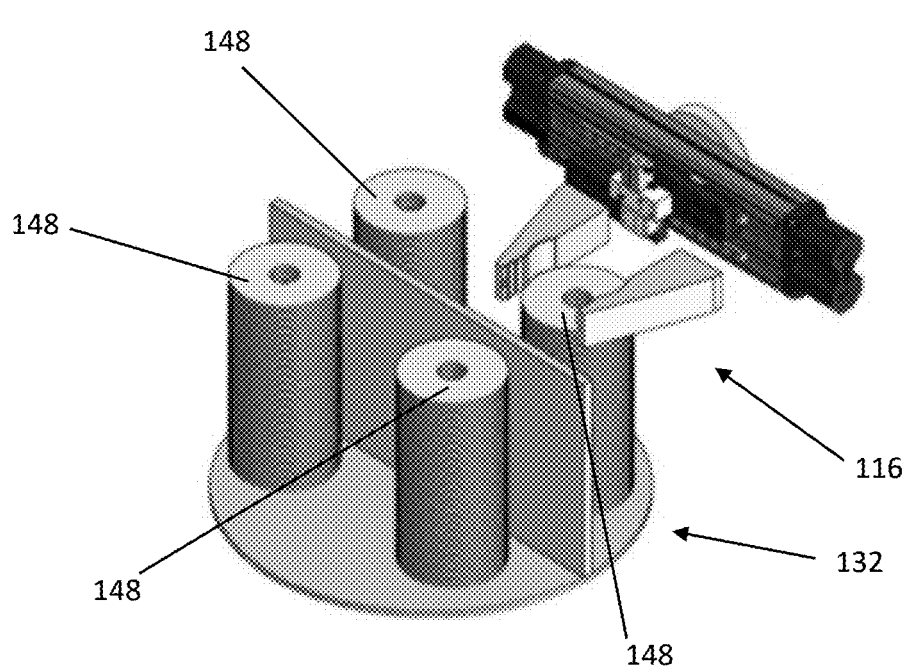
Figure 17:
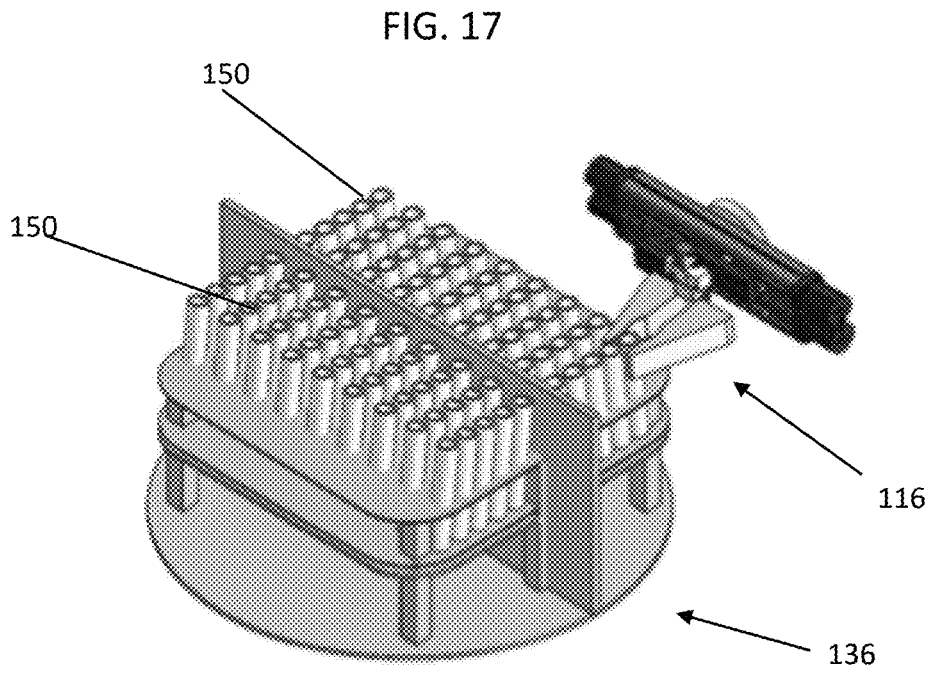
Figure 18:
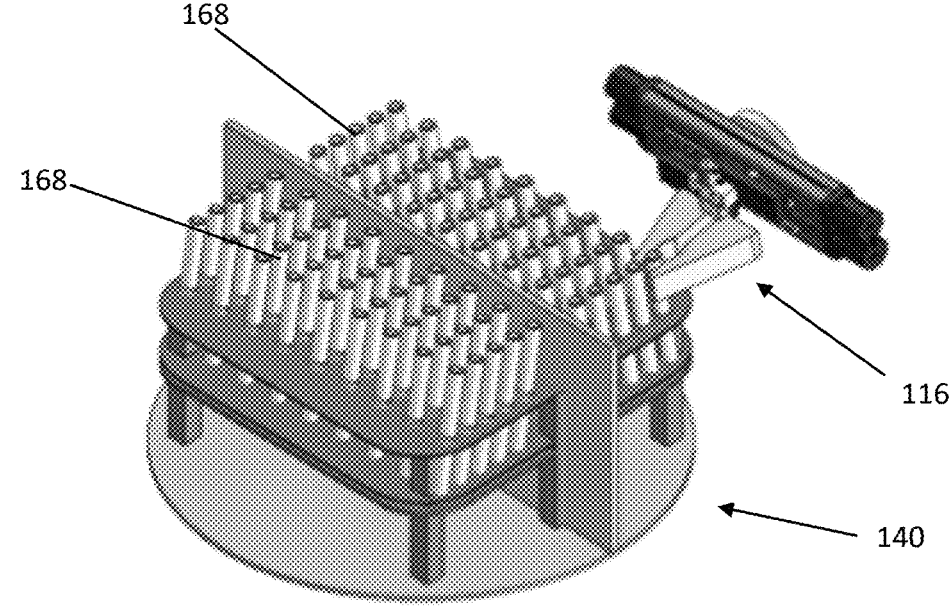

FIGS. 12-18 show the robotics arm gripper 116 handling elements of the wheel and axle during the manufacture process. FIG. 12 shows a pair of grippers 116 handling a bracket 164 with axle shaft 168 and a wheel 106, respectively. FIG. 13 shows a gripper 116 as it grabs an inner tube 150 with end discs 148. FIG. 14 shows a gripper 116 placing a bracket 164 on an axle shaft end 170 after it has been extended through the inner tube 150. FIGS. 15-18 show a gripper 116 grabbing a bracket 164, end disc 148, inner tube 150 and axle shaft 168, respectively, from their supply tables 134, 132, 136, 138.

Figure 19:
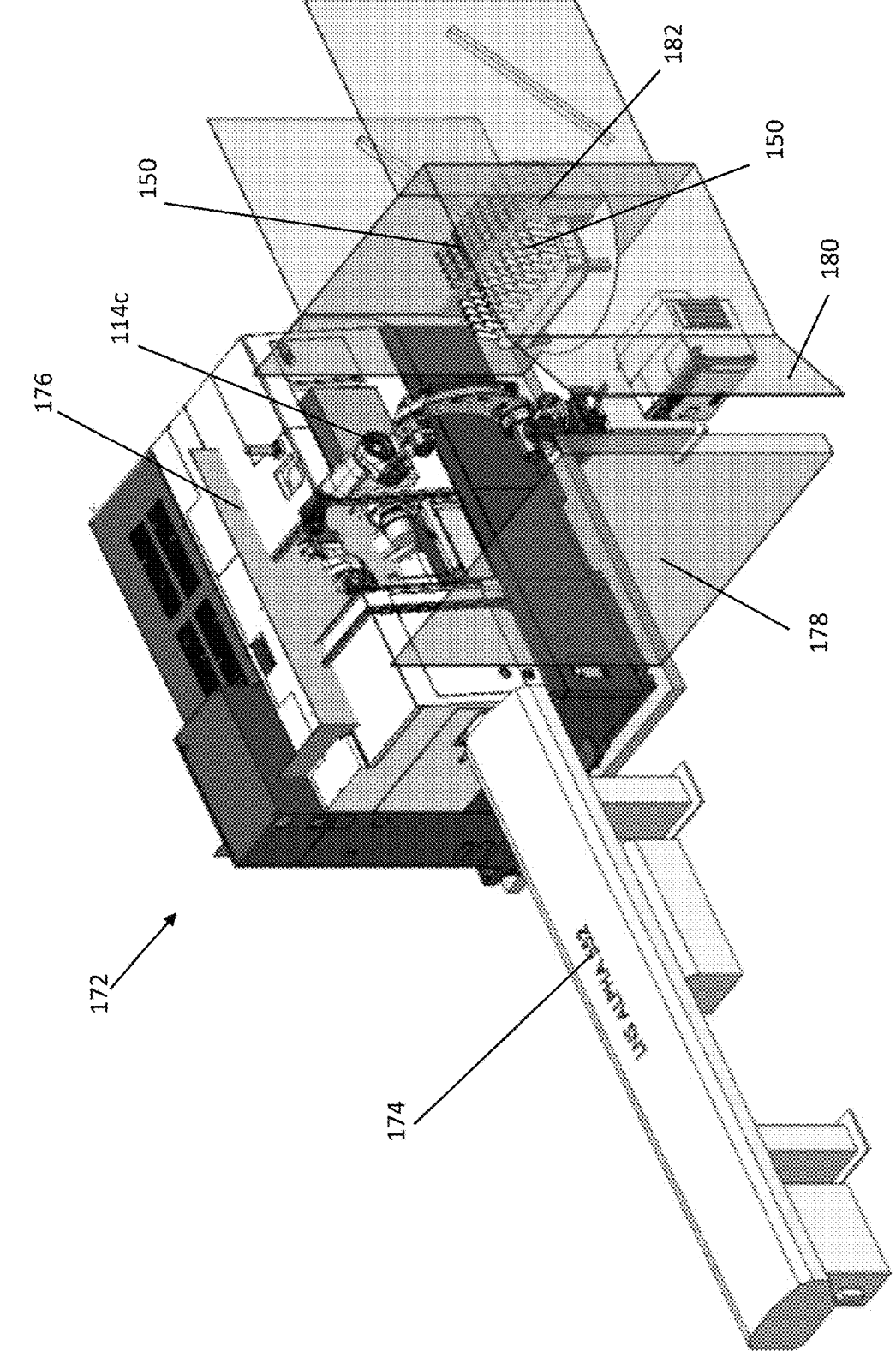
FIG. 19 is a perspective view of an automated milling station according to the present system.
Figure 20:
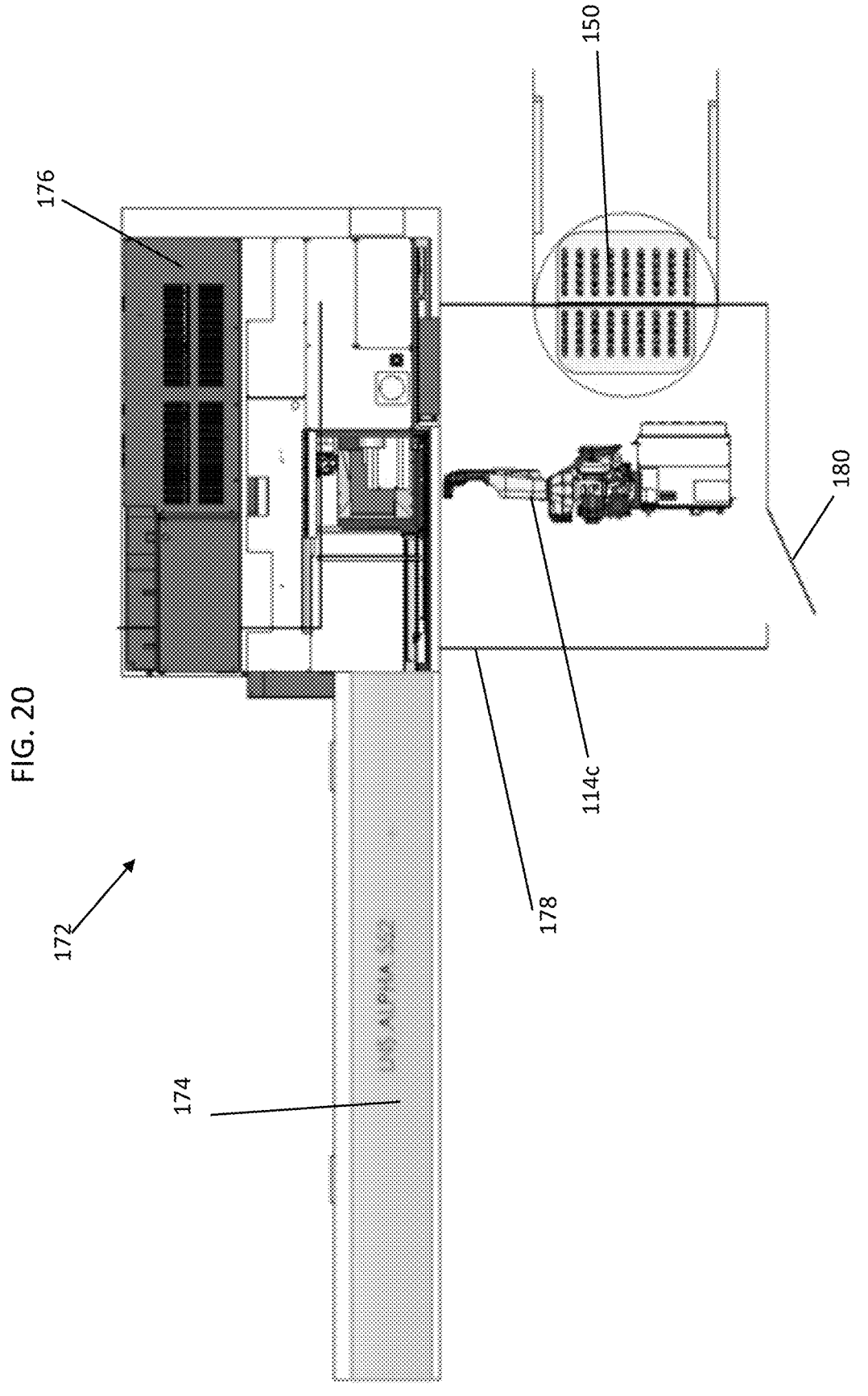
FIG. 20 is a top view of the milling station of FIG. 19.

Separate from the wheel assembly and welding units 110, 112, there is an automated milling unit 172 shown in FIGS. 19 and 20. This unit 172 is used to form the inner tube 150 and axle shaft 168 of the wheel assembly 104 from a metal bar (not shown). The unit 172 includes a bar feeder 174, a milling machine 176, and a robotic arm 114*c* with gripper (not shown). A bar is fed into the milling machine and the robotic arm with gripper arranges the bar to be milled by the machine. As sections of the bar are milled and cut, the robotic arm 114*c* moves them to a supply table for use with the assembly 110 and welding 112 units. The milling unit 172 also includes an enclosure 178 with an access door 180, along with an opening 182 through which a supply table is provided for storing completed wheel assembly parts. Preferably, the milling unit 172, assembly unit 110 and welding unit 112 are all in close proximity to one another within a manufacturing facility to provide for an efficient overall automated wheel assembly manufacturing process.

Although the above description includes reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An automated container wheel manufacturing system comprising:
   a. a mounting bracket and wheel end cap subsystem including a laser configured to manufacture mounting brackets and wheel end caps, a laser cutting table on which metal plates are cut, a roller table adjacent to the laser cutting table, at least one loading arm configured to load metal plates onto the laser cutting table, and at least one robotic arm arranged and programmed to sort mounting brackets and wheel end caps after they are cut by the laser;
   b. an axle housing subsystem including a saw arranged and programmed to manufacture axle housings from pipe, a conveyor belt connected to the saw for providing pipe to the saw, at least one robotic arm configured to move a cut axle housing from the saw to a staging area conveyor belt;
   c. an axle housing subsystem including a machining device configured to manufacture axle housing, a conveyor belt configured to load metal rods into the machining device, an axle housing staging area, and a smart conveyor belt configured to move the axle housings from the machining device to the axle housing staging area;
   d. a wheel pipe subsystem including a saw configured to cut wheel pipes, a pipe conveyer connected with the saw configured to load pipes into the saw, a wheel pipe conveyer configured to move wheel pipes from the saw to a wheel pipe staging area, and a robotic arm arranged and programmed to move wheel pipes from the saw to the wheel pipe conveyer; and
   e. a welding area including a plurality of robotic assembly and welding arms and an I-beam to which robots are attached for movement within a robotic zone, an axle housing and wheel end cap welding region, a wheel pipe welding region, and a bracket and axle welding region.

\* \* \* \* \*